(12) United States Patent
Pyron

(10) Patent No.: US 7,582,835 B2
(45) Date of Patent: Sep. 1, 2009

(54) SWEEP STYLE CONDUIT BODIES

(75) Inventor: Roger D. Pyron, Arlington, TN (US)

(73) Assignee: Thomas & Betts International, Inc., Wilmington, DE (US)

( * ) Notice: Subject to any disclaimer, the term of this patent is extended or adjusted under 35 U.S.C. 154(b) by 0 days.

(21) Appl. No.: 12/139,733

(22) Filed: Jun. 16, 2008

(65) Prior Publication Data
US 2009/0056971 A1    Mar. 5, 2009

Related U.S. Application Data

(60) Provisional application No. 60/966,451, filed on Aug. 28, 2007.

(51) Int. Cl.
*H02G 3/04* (2006.01)

(52) U.S. Cl. .................. 174/481; 174/480; 174/68.1; 174/68.3; 174/96; 174/24; 439/207; 248/300

(58) Field of Classification Search .......... 174/480, 174/481, 24, 19, 68.1, 68.3, 96; 248/300; 24/546; 220/3.8; 439/207, 582; 52/220.1
See application file for complete search history.

(56) References Cited

U.S. PATENT DOCUMENTS

| | | | |
|---|---|---|---|
| 2,222,438 A * | 11/1940 | Manson | 174/652 |
| 2,946,560 A | 7/1960 | Ferm | |
| 3,037,744 A | 6/1962 | Cooper | |
| 3,038,702 A | 6/1962 | Trunnell | |
| 3,944,184 A | 3/1976 | Fisch | |
| 4,337,922 A | 7/1982 | Streiff et al. | |
| 4,801,118 A | 1/1989 | Wium | |
| 4,909,481 A | 3/1990 | Tamm | |
| 4,951,923 A | 8/1990 | Couture | |
| 5,029,817 A | 7/1991 | Tamm | |
| D445,765 S | 7/2001 | Wojcik | |
| 6,271,476 B1 | 8/2001 | Bobowick et al. | |
| 6,388,193 B2 | 5/2002 | Maynard et al. | |
| D463,377 S | 9/2002 | Canty | |
| 6,527,302 B1 | 3/2003 | Gault et al. | |
| 6,580,029 B1 * | 6/2003 | Bing | 174/360 |
| 6,586,680 B1 | 7/2003 | Nelson | |
| 6,838,615 B2 | 1/2005 | Pyron | |
| 6,916,014 B1 | 7/2005 | Thomas | |
| 7,057,104 B1 * | 6/2006 | McCleskey | 174/505 |

FOREIGN PATENT DOCUMENTS

GB    2 254 966    10/1992

* cited by examiner

*Primary Examiner*—Dhiru R Patel
(74) *Attorney, Agent, or Firm*—Hoffmann & Baron, LLP

(57) ABSTRACT

A conduit body provides for the accommodation of wire extending therethrough. The conduit body includes a body wall having an elongate side wall, a bottom wall and an open end defining a body interior. At least one hub extends from the body wall in communication with the body interior. The hub includes a hub wall defining an access channel for passage of wire therethrough. The hub wall includes a guide surface outwardly of the body wall and protruding into the channel for maintaining a bend radius of the wire passing from the body interior through the channel.

10 Claims, 2 Drawing Sheets

SWEEP STYLE CONDUIT BODIES

CROSS-REFERENCE TO RELATED APPLICATION

This application claims priority to U.S. Provisional Patent Application No. 60/966,451, filed on Aug. 28, 2007, herein incorporated by reference.

FIELD OF THE INVENTION

The present invention relates generally to a conduit body containing electrical wires, and more particularly, relates to a conduit body which facilitates the passage of wires and cables therethrough.

BACKGROUND OF THE INVENTION

Electrical conduit systems are required in order to safely provide electrical power to industry, homes, commercial buildings and the like. These conduit systems often include long runs of rigid electrical conduit with frequent changes in direction, such as 90° turns. Conduit bodies are typically installed in the conduit systems at various locations, both to provide access to the wires and to route the wires along the conduit path. Often, the change of direction in the conduit is accomplished in the conduit body.

Conventional conduit bodies are generally elongate having longitudinal side walls defining an open ended chamber. A removable cover may be provided for closing the open side of the body. The conduit body may include hubs at locations along the body for attachment of the conduit and passage of the wire therethrough.

Certain arrangements of the hubs allow the conduit body to effect changes in direction such as a 90° turn in the wires being routed therethrough. In order to effect such a turn in a conduit body, the wire contained therein must be bent or curved. In certain situations, especially with the use of communications cables such as data cable and fiber optic cable, placing a small bend radius on the cable to effect the change in direction may adversely effect the performance of the cable.

The art has seen various devices used in combination with conduit bodies to help support the wire as it is passed through the conduit body especially where changes in direction are required. For example, U.S. Pat. Nos. 4,801,118 and 6,838,615 employ inserts placed in the conduit body to help facilitate movement of the wire therethrough.

Another example which specifically attempts to provide a minimum bend radius in a conduit body is U.S. Pat. No. 5,580,029. In the '029 patent, the conduit body is modified to provide an inwardly projecting curved bump on the bottom wall thereof. This bump forces the wire pulled therethrough to achieve a desirable bend radius upon making a change of direction therein. While this device may serve adequately to effect a desirable change in direction, the inwardly extending projection does provide an obstruction to the pulling of the wire through the conduit body and also reduces the usable interior capacity of the conduit body.

It is, therefore, desirable to provide a conduit body which effects a change in direction of wires pulled therethrough so as to maintain a desirable bend radius and which overcomes the deficiencies of the prior art.

SUMMARY OF THE INVENTION

A conduit body device accommodates wires therethrough. The device includes a conduit body having a body wall including an elongate side wall, a bottom wall, and an open end defining a body interior. The body includes at least one hub extending from the body wall in communication with the body interior. The hub includes a hub wall defining an access channel for passage of the wire therethrough. The hub wall includes a guide surface outwardly of said body wall and protruding into the channel for maintaining a bend radius of the wire passing from the body interior through the channel.

In a preferred embodiment, the hub wall is generally annular and the guide surface is an annular member extending radially into the channel.

The present invention also provides a conduit body for passage of wire therethrough. The conduit body includes an elongate bottom wall having an open upper end and a perimetrical side wall extending therebetween defining a body interior. A first annular hub extending from the side wall is in communication with the body interior. A second annular hub extends from the bottom wall and is also in communication with the body interior. The first and second hubs are disposed at generally a 90° angle with respect to one another. At least one of the first or second hubs includes an extending guide surface defining a protrusion engageable with the wire passing therethrough which increases the radius of the wire extending thereover.

BRIEF DESCRIPTION OF THE PREFERRED EMBODIMENT

The present invention provides a conduit body for use in electrical systems, including electrical conduit systems, where electrical wire and cables are run through various structures. The conduit body which is used in conduit systems allows the wires to be pulled through the conduit system and also effects changes of direction in the system.

Figure 1:
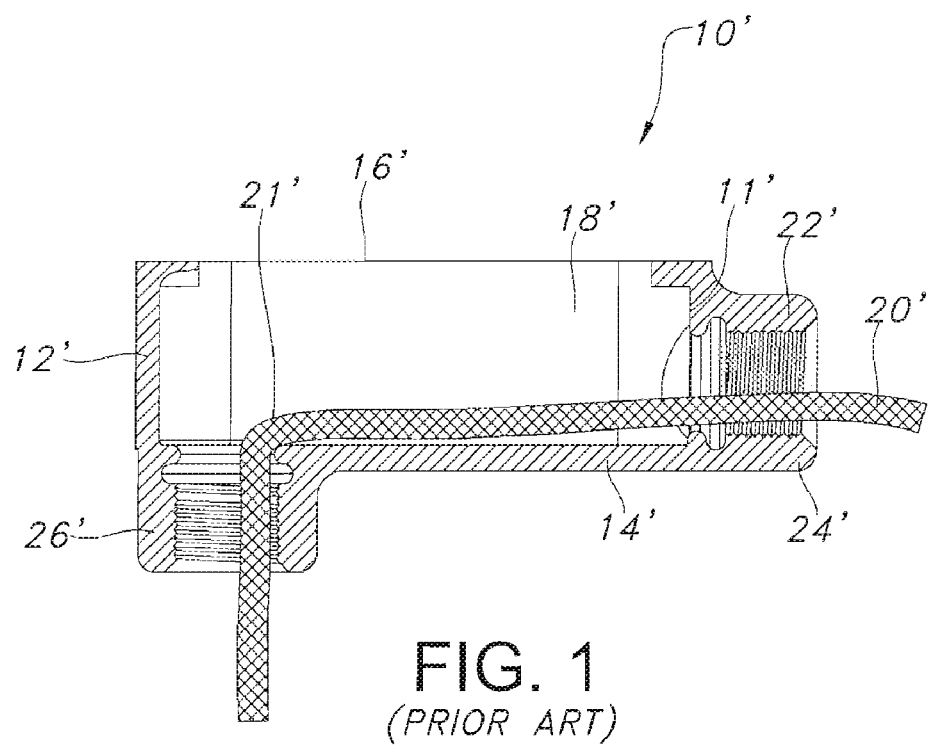
FIG. 1 shows a conventional conduit body of the prior art showing a change of direction in a wire passing therethrough.

FIG. 1 shows a conventional conduit body 10' currently used in conduit systems. Conduit body 10' is generally an elongate tubular shaped member generally formed of a material which, matches the conduit employed in the system. A typical conduit body is formed of metal or rigid plastic.

A conduit body 10' includes a conduit body wall 11' including an upwardly extending perimetrical side wall 12' having a closed bottom wall 14' and an opposed open end 16'. The open upper end 16' may be closed with a removable cover (not shown) which allows access to the interior 18' of conduit body 10'.

In order to provide passage of wire 20' through the conduit body 10', the conduit body 10' may include a plurality of hubs 22'. In the present illustrated embodiment, two hubs are shown. Lateral hub 24' extends from side wall 12' and depending hub 26' extends from bottom wall 14'. Each hub includes an access port including a central channel therethrough for allowing passage of wire 20' through the conduit body 10'. The hubs may be threaded to accommodate the attachment of conduit (not shown) thereto.

As can be seen in FIG. 1, a 90° change in direction of wire 20' may be accomplished in conduit body 10' by virtue of the orientation of hubs 24' and 26'. Each change in direction is achieved by placing a sharp 90° bend in wire 20' at bend location 21'. As may be appreciated especially with certain types of wires and cables, such as data cable and fiber optic cable, a sharp bend of this type may adversely effect the performance of the wire. Moreover, requiring such a sharp bend makes it more difficult to pull wire 20' through the conduit body 10'.

Figure 2:
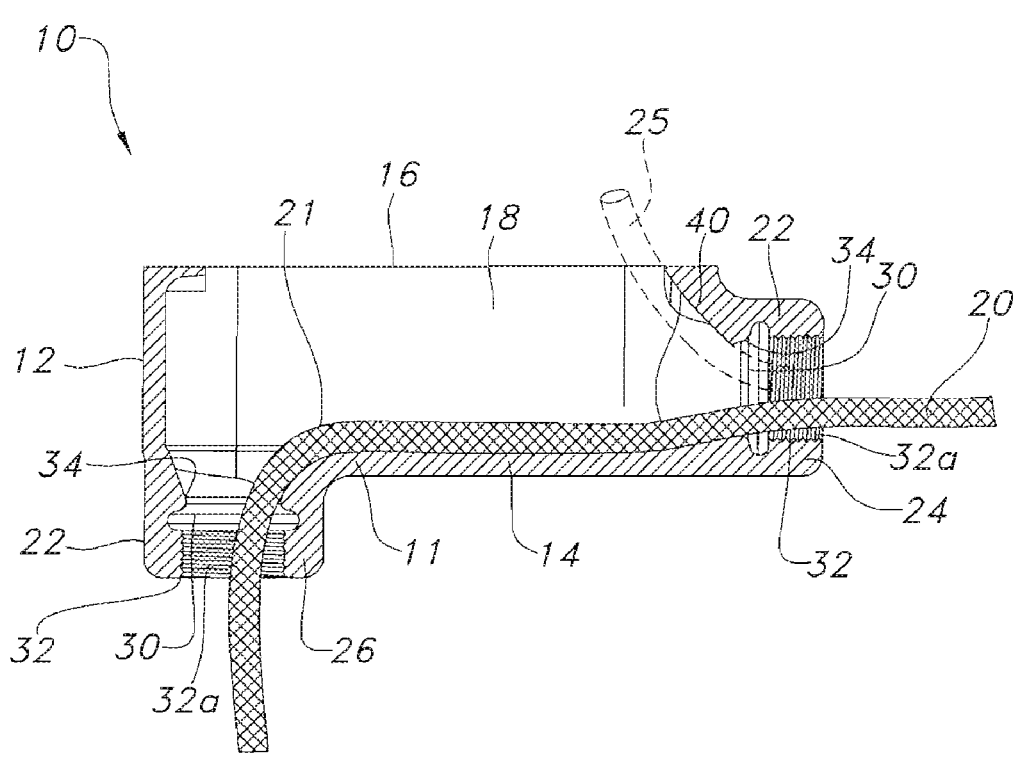
FIG. 2 shows the conduit body of the present invention showing a change in direction in a wire passing therethrough.
Figure 3:
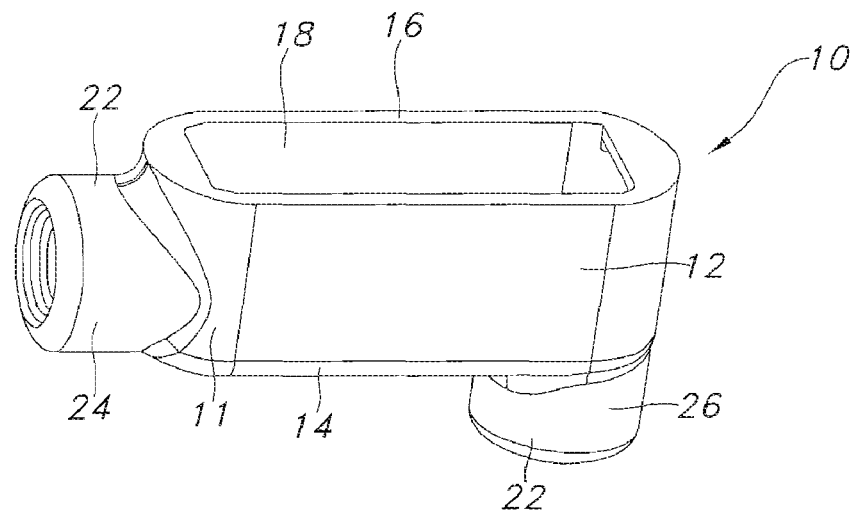
FIG. 3 is a perspective showing of the conduit body of the present invention.
Figure 4:
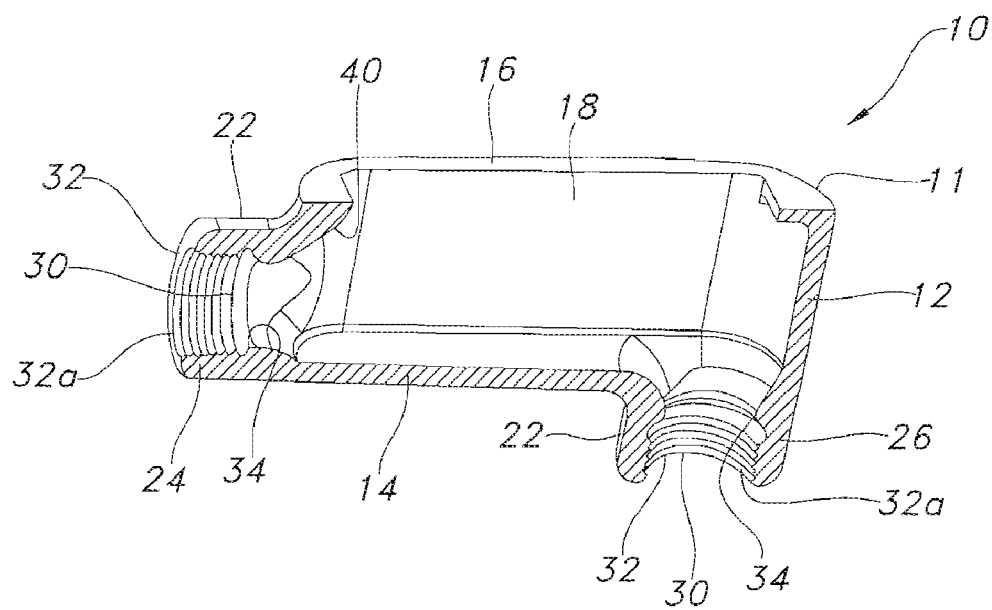
FIG. 4 is a cross sectional showing of the conduit body of FIG. 3.

Referring now to FIGS. 2 through 4, an improved conduit body 10 of the present invention is shown. Conduit body 10 is in some ways similar to the general configuration of conduit body 10' of FIG. 1, being an elongate body formed of suitable metal or plastic. Conduit body 10 includes a conduit body wall 11 including a perimetrical sidewall 12, a closed bottom wail 14 and an opposed open end 16. Conduit body 10 may also be closed by a removable cover (not shown) placed over open end 16 to enclose the interior 18 thereof.

Conduit, body 10 may also include one or more hubs 22 extending through wall 11 which provide access to the interior 18 thereof. Hubs 22 include a lateral hub 24 extending through sidewall 12 and a depending hub 26 extending through bottom wall 14. The hubs allow passage of wire 20 through conduit body 10. The arrangement shown herein allows a 90° change in the direction of the wire 20 to be achieved.

In order to overcome certain deficiencies of the prior art, the present invention provides structure which allows the change in direction of wire 20 to be achieved without-inducing the sharp bend in the wire.

Each of the hubs 22 extending from the body wall 11 of conduit body 10 is generally a hollow cylindrical member defining a generally tubular access channel 30 in communication with the interior 18 of conduit body 10. The access channel 30 is defined by generally cylindrical hub wall 32, a distal portion 32*a* of which may be internally threaded to accommodate the threaded attachment of conduit (not shown) thereto. As the hub 22 extends from the body wall 11 outwardly therefrom, the channel 30 extends from an inner surface of wall 11 along the hub wail 32.

The hub wall 32 includes radially inwardly extending annular guide surface 34. The inwardly extending guide surface 34 is located at a position which is within the access channel 30 outwardly of the body wall 11. Moreover, the inwardly protruding annular guide surface 34 protrudes radially such that it extends inwardly of the hub wall.

As can be particularly seen with respect to hub 26 of FIG. 2, this inward protrusion at a location outward of the hub wall 11 provides a greater bend radius to wire 20 extending therethrough. The bend location 21 of wire 20 has a larger radius than the bend location 21' of wire 20' shown in FIG. 1, due to the inwardly projecting guide surface 34 and its location below the level of body wall 11. The gradual curved extent of guide surface 34 also facilitates the gradual bend of wire 20 so as to effect a 90° change in direction.

A further feature of the present invention is particularly shown in FIGS. 2 and 4. An inwardly extending wall portion 40 of hub 24 may be gradually curved so that during the wire pulling operation, as the wire is being pulled through hub 24, it will encounter the curved surface 40 facilitating the easy movement of a wire 25 therethrough.

Thus, the present invention provides a conduit body which effects both change in direction of a wire therethrough and facilitates the smooth pulling of a wire therethrough without additional components and without occupying internal space within the interior of the conduit body.

While the invention has been described in related to the preferred embodiments with several examples, it will be understood by those skilled in the art that various changes may be made without deviating from the fundamental nature and scope of the invention as defined in the appended claims.

What is claimed is:

1. A conduit body device for accommodating wire therethrough said device comprising: a conduit body having a body wall including an elongate side wall and a bottom wall and an open end defining a body interior; at least one hub extending from said body wall in communication with said body interior, said hub including a hub wall defining an access channel for passage of said wire therethrough; said hub wall including a guide surface integrally formed in a passageways of the hub outwardly of said body wall and protruding into said channel for maintaining a bend radius of said wire passing from said body interior through said channel.

2. A conduit body device of claim 1 wherein said hub wall is generally annular and wherein said guide surface is generally annular and extends radially into said channel.

3. A conduit body device of claim 2 wherein said bottom wall has a planar extent and wherein said channel extends generally orthogonally from said planar extent.

4. A conduit body device of claim 3 wherein said channel is elongate having an upper extent opening at said planar surface and a lower extent spaced therefrom.

5. A conduit body device of claim 4 wherein said guide surface extends from said hub wall at a location spaced from said upper extent of said channel.

6. A conduit body device of claim 1 wherein at least one hub includes a curved transition surface located inside of said hub wall.

7. A conduit body for passage of wire therethrough comprising: an elongate bottom wall, an opposed open end and a perimetrical side wall extending therebetween defining a body interior; a first annular hub extending from said side wall and in communication with said body interior; a second annular hub extending from said bottom wall and in communication with said body interior, said first and second hubs being dispensed at generally a 90° angle from one another; at least one of said first and second hubs includes an extending guide surface integrally formed in a passageways of the hub and outwardly of the body interior for increasing the bend radius of said wire passing from said body interior through said channel.

8. A conduit body of claim 7 wherein said annular hubs including a tubular channel extending therethrough and wherein said guide surface of said at least one hub extends into said tubular channel.

9. A conduit body of claim 7 wherein each of said first and second annular hubs includes said extending guide surface.

10. A conduit body of claim 9 wherein said extending guide surfaces define wire engaging surfaces upon said passage of said wire therethrough.

* * * * *